(12) United States Patent
Xu et al.

(10) Patent No.: US 12,375,512 B2
(45) Date of Patent: Jul. 29, 2025

(54) METHOD FOR DETECTING HIDDEN MALICIOUS TRAFFIC BASED ON TRAFFIC INTERACTION MAP AND DEVICE

(71) Applicant: TSINGHUA UNIVERSITY, Beijing (CN)

(72) Inventors: Ke Xu, Beijing (CN); Chuanpu Fu, Beijing (CN); Qi Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 239 days.

(21) Appl. No.: 18/174,349

(22) Filed: Feb. 24, 2023

(65) Prior Publication Data
US 2023/0300160 A1   Sep. 21, 2023

(30) Foreign Application Priority Data
Mar. 15, 2022   (CN) .......................... 202210255959.4

(51) Int. Cl.
*H04L 9/40*   (2022.01)
(52) U.S. Cl.
CPC ...... *H04L 63/1425* (2013.01); *H04L 63/1416* (2013.01)
(58) Field of Classification Search
CPC .. H04L 63/14; H04L 63/1425; H04L 63/1416
See application file for complete search history.

(56) References Cited

U.S. PATENT DOCUMENTS

| 8,676,729 | B1* | 3/2014 | Keralapura | H04L 63/1416 706/12 |
| 11,316,824 | B1* | 4/2022 | Suri | H04L 67/1095 |
| 2006/0098579 | A1* | 5/2006 | Chang | H04L 41/22 370/242 |
| 2018/0332053 | A1* | 11/2018 | Weis | H04L 63/20 |

FOREIGN PATENT DOCUMENTS

| CN | 112217834 A | 1/2021 |
| CN | 113794680 A | 12/2021 |

OTHER PUBLICATIONS

CNIPA, First Office Action for CN Application No. 202210255959.4, Oct. 21, 2022.

* cited by examiner

*Primary Examiner* — Catherine Thiaw
*Assistant Examiner* — Daniel Elahian
(74) *Attorney, Agent, or Firm* — Hodgson Russ LLP (57) ABSTRACT

A method for detecting hidden malicious traffic based on a traffic interaction map and a device are provided. The method includes monitoring traffic passing through a gateway by a detection system operating in the gateway; obtaining a data packet granularity feature by performing feature extraction of granularity of a data packet on the traffic monitored; constructing a traffic interaction map according to the data packet granularity feature to represent a long-term interaction mode of the traffic by a graph structure of the traffic interaction map; and detecting an abnormal local structure on the traffic interaction map by a detection algo- (Continued)

rithm of graph learning based on the traffic interaction map, and marking the abnormal local structure as the corresponding hidden malicious traffic.

14 Claims, 2 Drawing Sheets

METHOD FOR DETECTING HIDDEN MALICIOUS TRAFFIC BASED ON TRAFFIC INTERACTION MAP AND DEVICE

CROSS-REFERENCE TO RELATED APPLICATION

This application claims priority to Chinese Patent Application No. 202210255959.4, filed on Mar. 15, 2022, the entire disclosure of which is incorporated herein by reference.

FIELD

The present disclosure relates to a field of network security technology, and more particularly to a method for detecting hidden malicious traffic based on a traffic interaction map and a device for detecting hidden malicious traffic based on a traffic interaction map.

BACKGROUND

In recent years, network security has become an important part of national security. Without network security, there is no national security, which demonstrates the importance of Internet security construction in national security construction. However, a large number of new network attacks are proposed every year, which are very covert and have encryption and a low rate. How to quickly detect new hidden network attacks has become an important issue in the network security research field.

SUMMARY

Embodiments of the present disclosure seek to solve at least one of the problems existing in the related art to at least some extent.

According to a first aspect of embodiments of the present disclosure, a method for detecting hidden malicious traffic based on a traffic interaction map is provided. The method includes monitoring traffic passing through a gateway by a detection system operating in the gateway; obtaining a data packet granularity feature by performing feature extraction of granularity of a data packet on the traffic monitored; constructing a traffic interaction map according to the data packet granularity feature to represent a long-term interaction mode of the traffic by a graph structure of the traffic interaction map; and detecting an abnormal local structure on the traffic interaction map by a detection algorithm of graph learning based on the traffic interaction map, and marking the abnormal local structure as the corresponding hidden malicious traffic.

Furthermore, in some embodiments of the present disclosure, constructing the traffic interaction map according to the data packet granularity feature includes performing long and short flow classification, performing short flow aggregation and performing long flow distribution fitting. The graph learning includes performing connectivity analysis, performing edge pre-clustering, recognizing a key node, and recognizing an abnormal interaction pattern.

Furthermore, in some embodiments of the present disclosure, performing the long and short flow classification includes assembling a data packet sequence obtained by the feature extraction into a flow according to a linking quaternion; dividing the flow into a long flow and a short flow according to the number of data packets contained in the flow; and processing the long flow and the short flow to construct the long flow and the short flow as edges on the traffic interaction map, respectively.

Furthermore, in some embodiments of the present disclosure, performing the short flow aggregation includes aggregating a preset number of similar short flows based on the short flow to classify the similar short flows into a short flow group; and constructing an edge representing the short flow based on the short flow group; wherein the edge of each short flow corresponds to a group of the similar short flows, the edge representing the short flow stores a packet-by-packet feature sequence, a quaternion linked by each short flow, and a timestamp of start of the linking.

Furthermore, in some embodiments of the present disclosure, performing the long flow distribution fitting includes fitting a packet feature distribution in the long flow by using a histogram, and constructing an edge corresponding to the long flow on the traffic interaction map; wherein in each long flow, the edge representing the long flow stores a quaternion linked by the long flow, a timestamp of the long flow, and a histogram corresponding to an approximate probability of the various packet feature distribution.

Furthermore, in some embodiments of the present disclosure, performing the connectivity analysis includes obtaining strongly connected components of the traffic interaction map by using a depth-first search algorithm, and segmenting the traffic interaction map according to the strongly connected components; and extracting coarse-grained statistical features of each strongly connected component based on the traffic interaction map segmented, clustering the strongly connected components by using the coarse-grained statistical features, and treating the strongly connected components deviating from a cluster center as abnormally strongly connected components.

Furthermore, in some embodiments of the present disclosure, performing the edge pre-clustering includes pre-clustering an edge of each of the abnormally strongly connected components, extracting graph structure features from the edge, and obtaining a cluster series by clustering the graph structure features using a DBSCAN algorithm; and selecting an edge corresponding to the cluster center of each cluster in the cluster series to represent the remaining edges in the cluster for subsequent processing.

Furthermore, in some embodiments of the present disclosure, recognizing the key node includes selecting, for a sub-graph composed of each node on the strongly connected component and each edge selected by the pre-clustering, a node set by solving a maximum node coverage problem; and determining the node selected in the node set as a key node with potential attack.

Furthermore, in some embodiments of the present disclosure, recognizing the abnormal interaction pattern includes extracting, for each key node, the edge that is selected by the pre-clustering and connected with the key node; extracting structural features of the traffic interaction map and statistical features of the traffic based on the edges extracted, so as to construct feature vectors and cluster the edges extracted; and based on clustering of the edges extracted, marking the edges deviating from the cluster center as edges with abnormal interaction patterns, and marking a flow corresponding to the edges with abnormal interaction patterns as hidden malicious traffic to obtain a detection result.

According to a second aspect of embodiments of the present disclosure, a device for detecting hidden malicious traffic based on a traffic interaction map is proved. The device includes a processor; and a memory for storing instructions executable by the processor. The processor is configured to monitor traffic passing through a gateway by a detection system operating in the gateway; obtain a data packet granularity feature by performing feature extraction of granularity of a data packet on the traffic monitored; construct a traffic interaction map according to the data packet granularity feature to represent a long-term interaction mode of the traffic by a graph structure of the traffic interaction map; and detect an abnormal local structure on the traffic interaction map by a detection algorithm of graph learning based on the traffic interaction map, and marking the abnormal local structure as the corresponding hidden malicious traffic.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

It is noted that embodiments and the features in embodiments of the present disclosure may be combined with each other without conflict. The present disclosure will be described in detail with reference to the accompanying drawings and in combination with embodiments.

The technology solves the problem of real-time hidden malicious traffic detection in high-bandwidth scenarios. In high-bandwidth scenarios such as backbone networks or enterprise gateways, the real-time detection and interception of hidden malicious traffic protects a large number of legitimate network users. In addition, tools that detect and analyze high-bandwidth traffic in wide area network (WAN) at a high speed help security researchers find new hidden network attacks and promote the research progress of Internet security.

Different from the traditional flood explicit malicious traffic (for example, distributed denial of service attack traffic, or scanning attack traffic), new hidden network attacks generally include encrypted traffic and low-rate traffic, such that these hidden attacks are hard to be detected. First, new network attacks generally use encrypted malicious traffic, which eliminates most of the traffic features and makes it closer to normal traffic. Secondly, new hidden attacks generally only generate low-rate malicious traffic, which does not have the typical flood features of traditional denial of service attacks. Thirdly, the mode of the new hidden malicious traffic is unknown, which cannot be detected by a special detection method designed based on the knowledge of the art.

Therefore, a traditional malicious traffic detection is not suitable for the new hidden malicious traffic detection. The network intrusion detection system based on deep packet detection is invalid for the encrypted new type of hidden malicious traffic, because it cannot read threat information from the encrypted load. In recent years, a malicious traffic detection scheme based on machine learning has been proposed and used. However, the new covert malicious traffic is generally slow and encrypted, and these normal traffic features may deceive the machine learning algorithm to misjudge it as normal traffic, and then bypass various interception methods.

In order to enable those skilled in the art to better understand the technical solution of the present disclosure, the technical solution in embodiments of the present disclosure will be described clearly and completely in combination with the drawings in embodiments of the present disclosure. Obviously, the described embodiments are only part of embodiments of the present disclosure, not all of them. Based on embodiments in the present disclosure, all other embodiments obtained by those skilled in the art without creative work should fall within the scope of protection of the present disclosure.

The following describes a method for detecting hidden malicious traffic based on a traffic interaction map and a device for detecting hidden malicious traffic based on a traffic interaction map according to embodiments of the present disclosure with reference to the attached drawings. The method for detecting hidden malicious traffic based on the traffic interaction map according to embodiments of the present disclosure will be described first with reference to the attached drawings.

Figure 1:
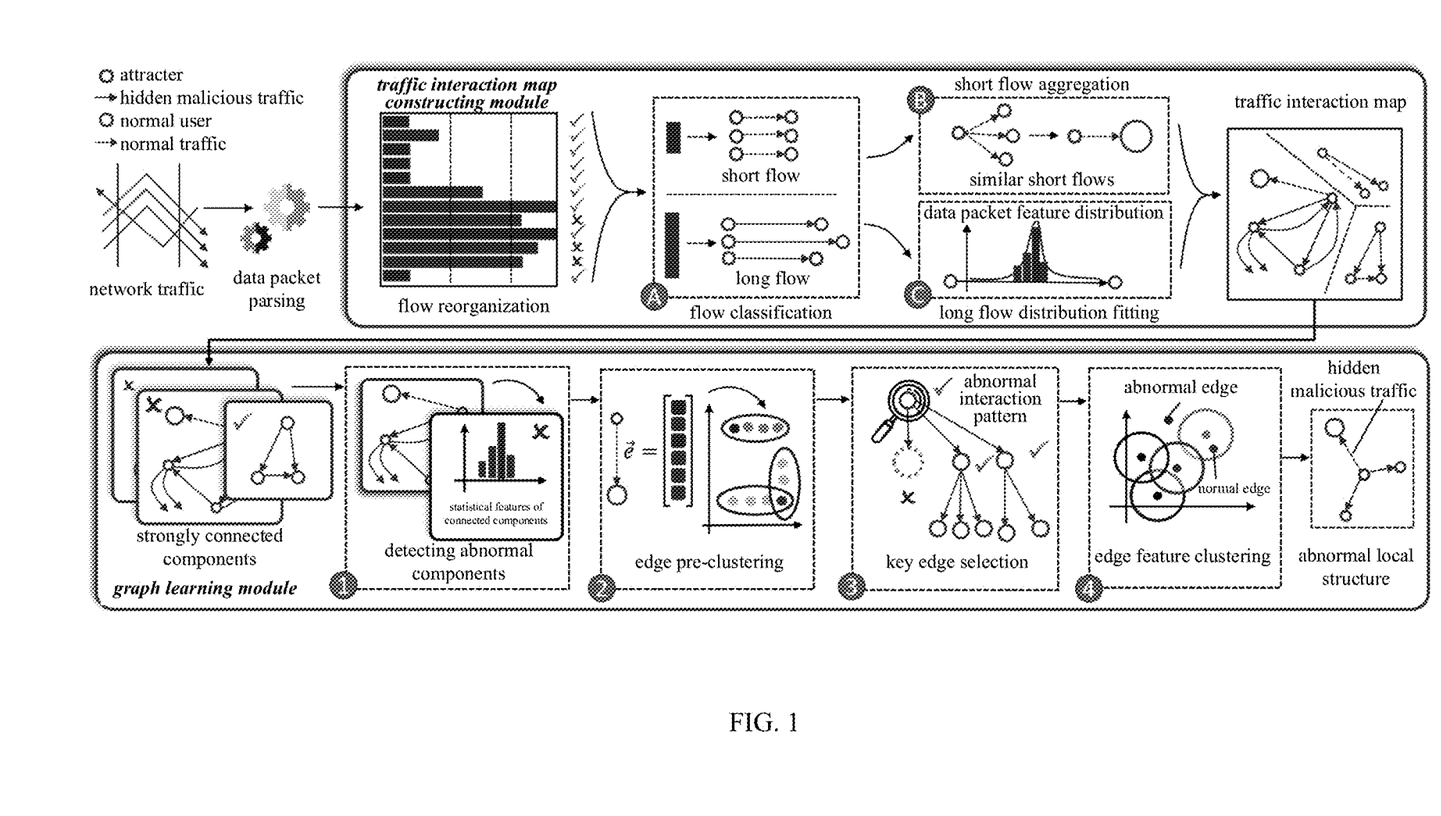
FIG. 1 is a schematic diagram showing a high-level system architecture for detecting hidden malicious traffic based on a traffic interaction map according to an embodiment of the present disclosure.

In the existing research, the malicious traffic detection technology is generally aimed at plaintext flood-type malicious traffic, but is not applicable to new hidden malicious traffic that is encrypted and has a low bandwidth, such that new attacks may bypass the traditional detection. The present disclosure solves the problem of real-time hidden malicious traffic detection in high-bandwidth scenarios, and provides a system including two technical modules of a traffic interaction map constructing module and a graph learning module. The traffic interaction map constructing module extracts and maintains a long-term traffic interaction mode between users from the traffic. The graph learning module identifies an abnormal interaction pattern represented by an abnormal local structure on the graph, so as to detect the hidden attacks from the abnormal interaction. Specifically, the traffic interaction map constructing module first assembles data packets in the high-speed network into flows, and classifies the flows according to the length of the flow. The traffic interaction map constructing module performs short flow aggregation and uses an edge to represent a group of short flows. For the long flow, the distribution fitting is performed, and a histogram is used to represent the feature distribution of the data packet of the long flow. Then, the address is used as a node and all the edges are assembled into the traffic interaction map. The graph learning module detects the abnormal interaction pattern represented by the abnormal local structure by (1) extracting strongly connected components of the graph, and identifying the abnormal strongly connected components by clustering; (2) pre-clustering the edges on each abnormal strongly connected component; (3) extracting key nodes from each strongly connected component to indicate potential attackers; (4) clustering the edges linked to the key nodes, and marking the traffic corresponding to edges deviating from the cluster center as abnormal traffic, as shown in FIG. 1.

Figure 2:
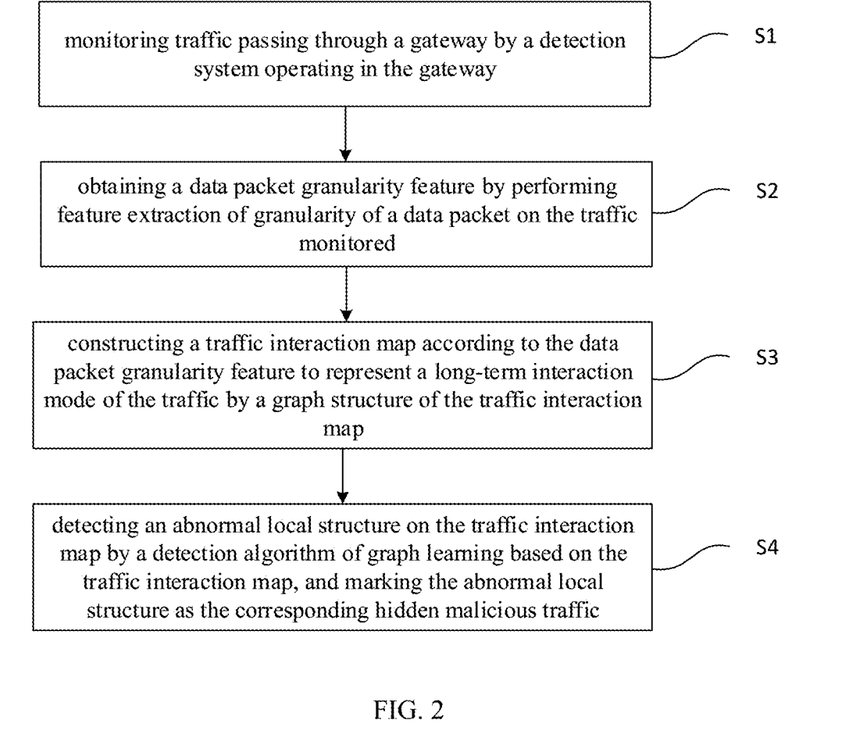
FIG. 2 is a flowchart showing a method for detecting hidden malicious traffic based on a traffic interaction map according to an embodiment of the present disclosure.

FIG. 2 is a flowchart showing a method for detecting hidden malicious traffic based on a traffic interaction map according to an embodiment of the present disclosure. As shown in FIG. 2, the method for detecting hidden malicious traffic based on the traffic interaction map includes the following steps S1 to S4.

In step S1, traffic passing through a gateway is monitored by a detection system operating in the gateway;

In step S2, a data packet granularity feature is obtained by performing feature extraction of granularity of a data packet on the traffic monitored.

In step S3, a traffic interaction map is constructed according to the data packet granularity feature to represent a long-term interaction mode of the traffic by a graph structure of the traffic interaction map.

Specifically, the detection system operates at the gateway and continuously monitors the traffic through the gateway. A data packet parsing module performs feature extraction of the granularity of the data packet on the traffic monitored. The data packet granularity features are output and passed to the traffic interaction map constructing module as input. The traffic interaction map constructing module uses the graph structure to represent the long-term interaction mode of the traffic, and simplifies and compresses the graph structure. Constructing the traffic interaction map includes performing long and short flow classification, performing short flow aggregation and performing long flow distribution fitting. The traffic interaction map constructed takes hosts as the nodes, and the network traffic transferred between the hosts as the edge, representing the long-term interaction mode between users.

Furthermore, the packet parsing engine operating on a data plane extracts the data packet granularity feature from the high-speed network traffic, and stores the data packet granularity feature in a memory as an input of the traffic interaction map constructing module.

Furthermore, the traffic interaction map constructing module assembles a data packet sequence into a flow according to a linking quaternion, the flow assembled is divided into a long flow and a short flow according to the number of packets contained in the flow, and the traffic interaction map constructing module processes the long flow and the short flow to construct the long flow and the short flow as the edges on the traffic interaction map, respectively.

Furthermore, for the short flows obtained from the above-mentioned classification, the traffic interaction map constructing module aggregates a large number of similar short flows, that is, classify the similar short flows into the same group. An edge representing the short flow is constructed, and each edge corresponds to a group of similar short flows. The edge representing the short flow stores a packet-by-packet feature sequence, a quaternion linked by each short flow, and a timestamp of start of the linking.

Furthermore, for the long flow obtained from the above-mentioned classification, the traffic interaction map constructing module uses a histogram to fit a packet feature distribution in the long flow, and constructs an edge corresponding to the long flow on the graph. For the long flow, the edge representing the long flow stores a quaternion linked by the long flow, a timestamp of the long flow, and a histogram corresponding to an approximate probability of the various packet feature distribution.

Finally, the module constructs the edges corresponding to the short flow and the long flow as the traffic interaction map and outputs it to the graph learning module as input.

For example, a specific process of the traffic interaction map of the present disclosure is as follows.

In step S11, a packet parsing engine operating in a data plane extracts the data packet granularity feature from the high-speed network traffic as the input to construct the traffic interaction map. These packet-by-packet features include a protocol type, length and the interval from the arrival time of the last packet. In addition, the quaternion representing the link to which the data packet belongs is extracted, such as source/destination address, and source/destination port.

In step S12, the traffic interaction map constructing module assembles a data packet sequence into a flow according to the linking quaternion. The data packets in the same flow contain the same source/destination address and source/destination port. Then, the long flow and the short flow are classified according to a specified traffic length classification threshold. If the number of data packets in a flow is greater than the threshold, it is determined as a long flow, otherwise it is determined as a short flow.

In step S13, for the short flows obtained in step S12, the traffic interaction map constructing module aggregates similar short flows. For all short flows obtained by classification, all short flows in any subset will be aggregated in case of meeting the following three conditions. (1) The group of flows has the same source address or destination address. (2) The group of flows comes from the same network protocol. (3) The number of flows in the group is large enough. Then, an edge representing the short flow is constructed. For a group of similar short flows gathered, only one edge is constructed. The edge stores a packet-by-packet feature sequence (the length of each data packet, protocol, and a time interval with the previous data packet), and stores the quaternion identifying the link for all the short flows, and a timestamp of start of the linking. In addition, only one copy of data is stored for the same fields in the quaternion.

In step S14, for the long flow obtained in S12, the traffic interaction map constructing module uses a histogram to fit a packet feature distribution in the long flow, and constructs an edge corresponding to the long flow on the graph. Specifically, the traffic interaction map constructing module adopts a hash table to construct the histogram, and adopts different hash bucket widths for different packet-by-packet features. The traffic interaction map constructing module traverses each packet-by-packet feature, divides a value of the feature by the bucket width to obtain the corresponding hash value, and increases a counter corresponding to the hash value by itself. Each hash value and the corresponding counter are stored as the extracted histogram. Finally, the edge representing the long flow stores the link quaternion of the long flow and three histograms representing the distribution, which correspond to the three feature distributions of packet length, packet protocol and packet time interval.

In step S15, for all edges constructed in step S13 and step S14, the module extracts the source address and destination address as nodes on the graph, and connects all edges with corresponding nodes to construct the traffic interaction map.

In step S4, an abnormal local structure on the traffic interaction map is detected by a detection algorithm of graph learning based on the traffic interaction map, and the abnormal local structure is marked as the corresponding hidden malicious traffic.

It is understood that after the construction of the traffic interaction map, the graph learning module of the present disclosure uses an unsupervised algorithm to automatically detect the abnormal local structure, and marks the hidden malicious traffic corresponding to the abnormal local structure. The graph learning module includes performing connectivity analysis, performing edge pre-clustering, recognizing a key node, and recognizing an abnormal interaction pattern.

Specifically, the graph learning module first adopts the depth-first search algorithm to obtain all the strongly connected components of the graph, and segments the graph according to the strongly connected components obtained. The coarse-grained statistical features of each strongly connected component are extracted, and the statistical features are used to cluster the strongly connected components, and the strongly connected components that deviate significantly from the cluster center are taken as the abnormal strongly connected components for further analysis.

Furthermore, an edges of each of the abnormally strongly connected components obtained above are pre-clustered, and the graph structural features are extracted from each edge. The DBSCAN algorithm is applied to cluster the graph structure features to obtain a cluster series. For each cluster, an edge corresponding to the cluster center of each cluster is selected to represent the remaining edges in the cluster for subsequent processing.

Furthermore, for a sub-graph composed of each node on the strongly connected component and each edge selected by pre-clustering, the learning algorithm selects a node set by solving a maximum node coverage problem, and the node selected is determined as a key node with potential attack.

Furthermore, for each key node obtained above, all edges that are selected by pre-clustering and connected with the key node are extracted. For these edges, the structural features of the traffic interaction map and the statistical features are extracted, so as to construct feature vectors and cluster the edges extracted. The edges deviating significantly from the cluster center are marked as edges with abnormal interaction patterns, and a flow corresponding to the edges is marked as hidden malicious traffic to obtain a detection result.

For example, the specific process of traffic detection in the graph learning of the present disclosure is as follows.

In step S21, the graph learning module adopts the depth-first search algorithm to obtain all strongly connected components of the traffic interaction map, and divides the traffic interaction map according to the strongly connected components obtained. Coarse-grained statistical features are extracted from each strongly connected component, and DBSCAN clustering algorithm is used to cluster the strongly connected components according to the coarse-grained statistical features. The strongly connected component that is significantly deviated from the cluster center is treated as the abnormally connected component for the next analysis, and the normally connected component close to the cluster center is excluded since it is considered that it only contains normal traffic.

In step S22, each edge of each of the strongly connected components filtered in S21 is subjected to pre-cluster, and the graph structure features are extracted for each edge. All feature vectors are normalized to apply a DBSCAN algorithm to cluster the structural features of the edges to obtain a series of clusters composed of edges. For each cluster, an edge corresponding to the center is selected to represent the remaining edges in the cluster for subsequent processing.

In step S23, a maximum node coverage problem is solved for a sub-graph composed of each node on the strongly connected component obtained in step S21 and each edge selected by the pre-clustering in step S22. Specifically, a subset is selected from all node sets, which meets the following two conditions: (1) the source node and/or destination node of each edge are in the set; (2) no subset satisfies condition (1) and is smaller than the subset selected. The node selected is solved as the key node representing the potential attacker.

In step S24, for each key node selected in step S23, all the edges connected to the key nodes are selected. These edges need to be pre-clustered in step S22. For the edges selected, the graph structural features and the statistical features of the traffic are extracted and assembled into feature vectors, and K-Means algorithm is used to cluster the edges. The edges that deviate significantly from the cluster center are marked as abnormal edges, which are associated with abnormal interaction patterns. The flow corresponding to the edge is marked as hidden malicious traffic as the detection result.

It is noted that in the existing art, the new hidden malicious traffic cannot be effectively detected, because the hidden malicious traffic has the characteristics of low speed and encryption. The new malicious traffic is closer to the normal traffic in WAN from the perspective of characteristics, so it is hard to be recognized by a machine learning algorithm. Most of the traffic is encrypted, so it cannot be recognized based on deep packet detection. The malicious traffic has never been detected, so it is impossible to design a special detection scheme based on domain knowledge.

Therefore, through the above-mentioned detection steps of the present disclosure, the graph structure is used to represent the long-term interaction history information of the traffic, and the graph structural features may significantly represent the abnormal interaction patterns of the hidden malicious traffic. The unsupervised graph learning algorithm is used to automatically mine abnormal interaction patterns from the traffic interaction map constructed. Finally, all kinds of hidden abnormal traffic may be detected in real time in high-bandwidth scenarios, and a detection throughput exceeding 100 Gbps and a low detection time delay of up to 13.99 seconds may be guaranteed.

By the method for detecting hidden malicious traffic based on the traffic interaction map in embodiments of the present disclosure, the graph structure is used to represent the long-term traffic interaction mode between network users, the unsupervised machine learning is used to detect the abnormal interaction pattern on the traffic interaction map, and the hidden malicious traffic is identified according to the abnormal interaction pattern. Because the hidden malicious traffic has significant abnormal interaction features, the method may detect a variety of hidden malicious traffic that cannot be detected by traditional processes. Because the graph constructing process and the graph learning algorithm have the characteristics of low computation and storage overhead, the method in the present disclosure has high detection throughput, low latency and high accuracy, which ensures the real-time automatic identification of the hidden malicious traffic in high-bandwidth scenarios while taking into account the computation and the storage overhead.

The method for detecting hidden malicious traffic based on the traffic interaction map in the present disclosure adopts the graph structure to effectively represent the long-term interaction mode of the hidden malicious traffic in real-time, and adopts the graph learning algorithm to mine the local structure representing the abnormal interaction pattern on the graph, so as to identify the hidden malicious traffic associated with it. The present disclosure has high detection throughput and low detection delay, which may accurately detect unknown new hidden network attacks in high-bandwidth scenarios.

It is noted that there are many ways to implement the method for detecting hidden malicious traffic based on the traffic interaction map, but no matter what the specific implementation process is, as long as the method solves the real-time hidden malicious traffic detection problem in the high-bandwidth scenario in the existing art, it is aimed at solving the existing technical problems and has the corresponding effect.

Figure 3:
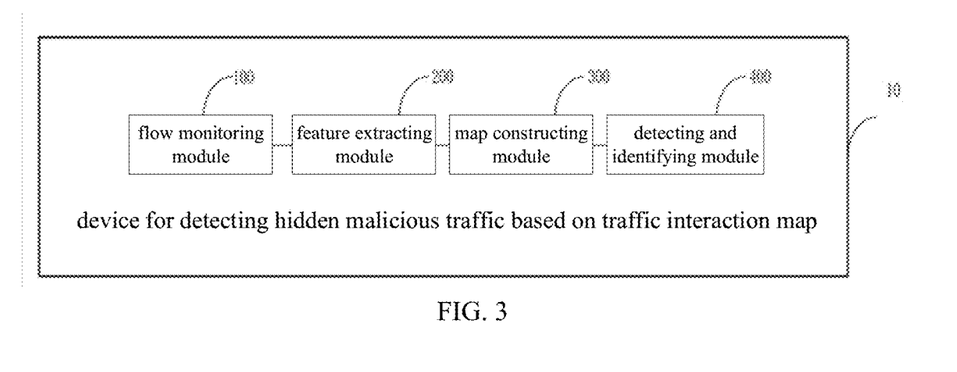
FIG. 3 is a schematic diagram showing a device for detecting hidden malicious traffic based on a traffic interaction map according to an embodiment of the present disclosure.

In order to realize the above-mentioned embodiments, as shown in FIG. 3, embodiments also provide a device 10 for detecting hidden malicious traffic based on a traffic interaction map.

The device 10 includes a flow monitoring module 100, a feature extracting module 200, a map constructing module 300 and a detecting and identifying module 400.

The flow monitoring module 100 is configured to monitor traffic passing through a gateway by a detection system operating in the gateway;

The feature extracting module 200 is configured to obtain a data packet granularity feature by performing feature extraction of granularity of a data packet on the traffic monitored;

The map constructing module 300 is configured to construct a traffic interaction map according to the data packet granularity feature to represent a long-term interaction mode of the traffic by a graph structure of the traffic interaction map;

The detecting and identifying module 400 is configured to detect an abnormal local structure on the traffic interaction map by a detection algorithm of graph learning based on the traffic interaction map, and marking the abnormal local structure as the corresponding hidden malicious traffic.

By the device for detecting hidden malicious traffic based on the traffic interaction map in embodiments of the present disclosure, the graph structure is used to represent the long-term traffic interaction mode between network users, the unsupervised machine learning is used to detect the abnormal interaction pattern on the traffic interaction map, and the hidden malicious traffic is identified according to the abnormal interaction pattern. Because the hidden malicious traffic has significant abnormal interaction features, the method may detect a variety of hidden malicious traffic that cannot be detected by traditional processes. Because the graph constructing process and the graph learning algorithm have the characteristics of low computation and storage overhead, the device in the present disclosure has high detection throughput, low latency and high accuracy, which ensures the real-time automatic identification of the hidden malicious traffic in high-bandwidth scenarios while taking into account the computation and the storage overhead.

The device for detecting hidden malicious traffic based on the traffic interaction map in the present disclosure adopts the graph structure to effectively represent the long-term interaction mode of the hidden malicious traffic in real-time, and adopts the graph learning algorithm to mine the local structure representing the abnormal interaction pattern on the graph, so as to identify the hidden malicious traffic associated with it. The present disclosure has high detection throughput and low detection delay, which may accurately detect unknown new hidden network attacks in high-bandwidth scenarios.

It is noted that the above explanation of embodiments of the method for detecting hidden malicious traffic based on the traffic interaction map is also applicable to the device for detecting hidden malicious traffic based on the traffic interaction map of embodiments in the present disclosure, which will not be repeated here.

The present disclosure further provides a device for detecting hidden malicious traffic based on a traffic interaction map is proved. The device includes a processor; and a memory for storing instructions executable by the processor. The processor is configured to monitor traffic passing through a gateway by a detection system operating in the gateway; obtain a data packet granularity feature by performing feature extraction of granularity of a data packet on the traffic monitored; construct a traffic interaction map according to the data packet granularity feature to represent a long-term interaction mode of the traffic by a graph structure of the traffic interaction map; and detect an abnormal local structure on the traffic interaction map by a detection algorithm of graph learning based on the traffic interaction map, and marking the abnormal local structure as the corresponding hidden malicious traffic.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, such as two or three, unless specified otherwise.

In the description of this specification, the reference term "an embodiment," "some embodiments," "an example," "a specific example," or "some examples," means that a particular feature, structure, material, or characteristic described in connection with the embodiment or example is included in at least one embodiment or example of the present disclosure. In this specification, the above-mentioned term in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for detecting hidden malicious traffic based on a traffic interaction map, comprising:
   monitoring traffic passing through a gateway by a detection system operating in the gateway;
   obtaining a data packet granularity feature by performing feature extraction of granularity of a data packet on the traffic monitored;
   constructing a traffic interaction map according to the data packet granularity feature to represent an interaction mode of the traffic by a graph structure of the traffic interaction map; and
   detecting a target local structure on the traffic interaction map by a detection algorithm of graph learning based on the traffic interaction map, and marking the target local structure as the corresponding hidden malicious traffic;
   wherein constructing the traffic interaction map according to the data packet granularity feature comprises performing long and short flow classification, performing short flow aggregation and performing long flow distribution fitting; and
   the graph learning comprises performing connectivity analysis, performing edge pre-clustering, recognizing a key node, and recognizing an interaction pattern;

wherein performing the long and short flow classification comprises:
  assembling a data packet sequence obtained by the feature extraction into a flow according to a linking quaternion;
  dividing the flow into a long flow and a short flow according to a number of data packets contained in the flow, wherein the long flow includes a number of data packets greater than a threshold, and the short flow includes a number of data packets less than the threshold; and
  processing the long flow and the short flow to construct the long flow and the short flow as edges on the traffic interaction map, respectively.

2. The method according to claim 1, wherein performing the short flow aggregation comprises:
  aggregating a preset number of similar short flows based on the short flow to classify the similar short flows into a short flow group; and
  constructing an edge representing the short flow based on the short flow group;
  wherein the edge of each short flow corresponds to a group of the similar short flows, the edge representing the short flow stores a packet-by-packet feature sequence, a quaternion linked by each short flow, and a timestamp of start of the linking.

3. The method according to claim 1, wherein performing the long flow distribution fitting comprises:
  fitting a packet feature distribution in the long flow by using a histogram, and constructing an edge corresponding to the long flow on the traffic interaction map;
  wherein in each long flow, the edge representing the long flow stores a quaternion linked by the long flow, a timestamp of the long flow, and a histogram corresponding to an approximate probability of the various packet feature distribution.

4. The method according to claim 1, wherein performing the connectivity analysis comprises:
  obtaining strongly connected components (SSCs) of the traffic interaction map by using a depth-first search algorithm, and segmenting the traffic interaction map according to the SSCs; and
  extracting coarse-grained statistical features of each SSC based on the traffic interaction map segmented, clustering the SSCs by using the coarse-grained statistical features, and treating the SSCs deviating from a cluster center as abnormal SSCs.

5. The method according to claim 4, wherein performing the edge pre-clustering comprises:
  pre-clustering an edge of each of the abnormal SSCs, extracting graph structure features from the edge, and obtaining a cluster series by clustering the graph structure features using a DBSCAN algorithm; and
  selecting an edge corresponding to the cluster center of each cluster in the cluster series to represent the remaining edges in the cluster for subsequent processing.

6. The method according to claim 5, wherein recognizing the key node comprises:
  selecting, for a sub-graph composed of each node on the SSC and each edge selected by the pre-clustering, a node set by solving a maximum node coverage problem; and
  determining the node selected in the node set as a key node with potential attack.

7. The method according to claim 6, wherein recognizing the interaction pattern comprises:
  extracting, for each key node, the edge that is selected by the pre-clustering and connected with the key node;
  extracting structural features of the traffic interaction map and statistical features of the traffic based on the edges extracted, so as to construct feature vectors and cluster the edges extracted; and
  based on clustering of the edges extracted, marking the edges deviating from the cluster center as edges with abnormal interaction patterns, and marking a flow corresponding to the edges with abnormal interaction patterns as hidden malicious traffic to obtain a detection result.

8. A device for detecting hidden malicious traffic based on a traffic interaction map, comprising:
  a processor; and
  a memory for storing instructions executable by the processor;
  wherein the processor is configured to:
    monitor traffic passing through a gateway by a detection system operating in the gateway;
    obtain a data packet granularity feature by performing feature extraction of granularity of a data packet on the traffic monitored;
    construct a traffic interaction map according to the data packet granularity feature to represent an interaction mode of the traffic by a graph structure of the traffic interaction map; and
    detect a target local structure on the traffic interaction map by a detection algorithm of graph learning based on the traffic interaction map, and mark the target local structure as the corresponding hidden malicious traffic;
  wherein the processor is further configured to:
    perform long and short flow classification, perform short flow aggregation and perform long flow distribution fitting;
  the graph learning comprises performing connectivity analysis, performing edge pre-clustering, recognizing a key node, and recognizing an interaction pattern; and
  performing long and short flow classification comprises:
    assembling a data packet sequence obtained by the feature extraction into a flow according to a linking quaternion;
    dividing the flow into a long flow and a short flow according to a number of data packets contained in the flow, wherein the long flow includes a number of data packets greater than a threshold, and the short flow includes a number of data packets less than the threshold; and
    processing the long flow and the short flow to construct the long flow and the short flow as edges on the traffic interaction map, respectively.

9. The device according to claim 8, wherein the processor is configured to:
  aggregate a preset number of similar short flows based on the short flow to classify the similar short flows into a short flow group; and
  construct an edge representing the short flow based on the short flow group;
  wherein the edge of each short flow corresponds to a group of the similar short flows, the edge representing the short flow stores a packet-by-packet feature sequence, a quaternion linked by each short flow, and a timestamp of start of the linking.

10. The device according to claim 8, wherein the processor is configured to:

fit a packet feature distribution in the long flow by using a histogram, and construct an edge corresponding to the long flow on the traffic interaction map; wherein in each long flow, the edge representing the long flow stores a quaternion linked by the long flow, a timestamp of the long flow, and a histogram corresponding to an approximate probability of the various packet feature distribution.

11. The device according to claim 8, wherein the processor is configured to:

obtain strongly connected components (SSCs) of the traffic interaction map by using a depth-first search algorithm, and segment the traffic interaction map according to the SSCs; and extract coarse-grained statistical features of each SSC based on the traffic interaction map segmented, cluster the SSCs by using the coarse-grained statistical features, and treat the strongly SSCs deviating from a cluster center as abnormal SSCs.

12. The device according to claim 11, wherein the processor is configured to:

pre-cluster an edge of each of the abnormal SSCs, extracting graph structure features from the edge, and obtain a cluster series by clustering the graph structure features using a DBSCAN algorithm; and select an edge corresponding to the cluster center of each cluster in the cluster series to represent the remaining edges in the cluster for subsequent processing.

13. The device according to claim 12, wherein the processor is configured to:

select, for a sub-graph composed of each node on the SSC and each edge selected by the pre-clustering, a node set by solving a maximum node coverage problem; and determine the node selected in the node set as a key node with potential attack.

14. The device according to claim 13, wherein the processor is configured to:

extract, for each key node, the edge that is selected by the pre-clustering and connected with the key node;

extract structural features of the traffic interaction map and statistical features of the traffic based on the edges extracted, so as to construct feature vectors and cluster the edges extracted; and based on clustering of the edges extracted, mark the edges deviating from the cluster center as edges with abnormal interaction patterns, and mark a flow corresponding to the edges with abnormal interaction patterns as hidden malicious traffic to obtain a detection result.

* * * * *